INVENTORS.
WILLIAM T. FROST
CHARLES T. MASTERS
BY Arthur Decker
ATTORNEY

May 19, 1970 W. T. FROST ET AL 3,513,266

MAGNETIC RECORDING SYSTEM FOR WIDEBAND SIGNAL MULTIPLEXING BY FREQUENCY MODULATION

Filed Feb. 27, 1967 2 Sheets-Sheet 2

United States Patent Office 3,513,266

Patented May 19, 1970

3,513,266

MAGNETIC RECORDING SYSTEM FOR WIDE-BAND SIGNAL MULTIPLEXING BY FREQUENCY MODULATION

William T. Frost, Los Gatos, and Charles T. Masters, San Jose, Calif., assignors to International Business Machines Corporation, Armonk, N.Y., a corporation of New York Filed Feb. 27, 1967, Ser. No. 618,692
Int. Cl. G11b *5/04, 5/44;* H04n *5/78*
U.S. Cl. 179—100.2 9 Claims

ABSTRACT OF THE DISCLOSURE

A recording system wherein a source of frequency modulated video signals is converted to a square wave signal. This square wave signal is fed to a first bistable circuit which is responsive only to the leading edges of the signal to change state. The square wave signal also is fed to a second bistable circuit which is responsive only to the trailing edges of the square wave signal to produce a third signal. The second and third signals are recorded on separate tracks so that the bandwidth of the individual track is half that required for the original square wave signal. When these signals are read out, they are combined, passed through a low pass filter and thence to a video display.

Figure 1:
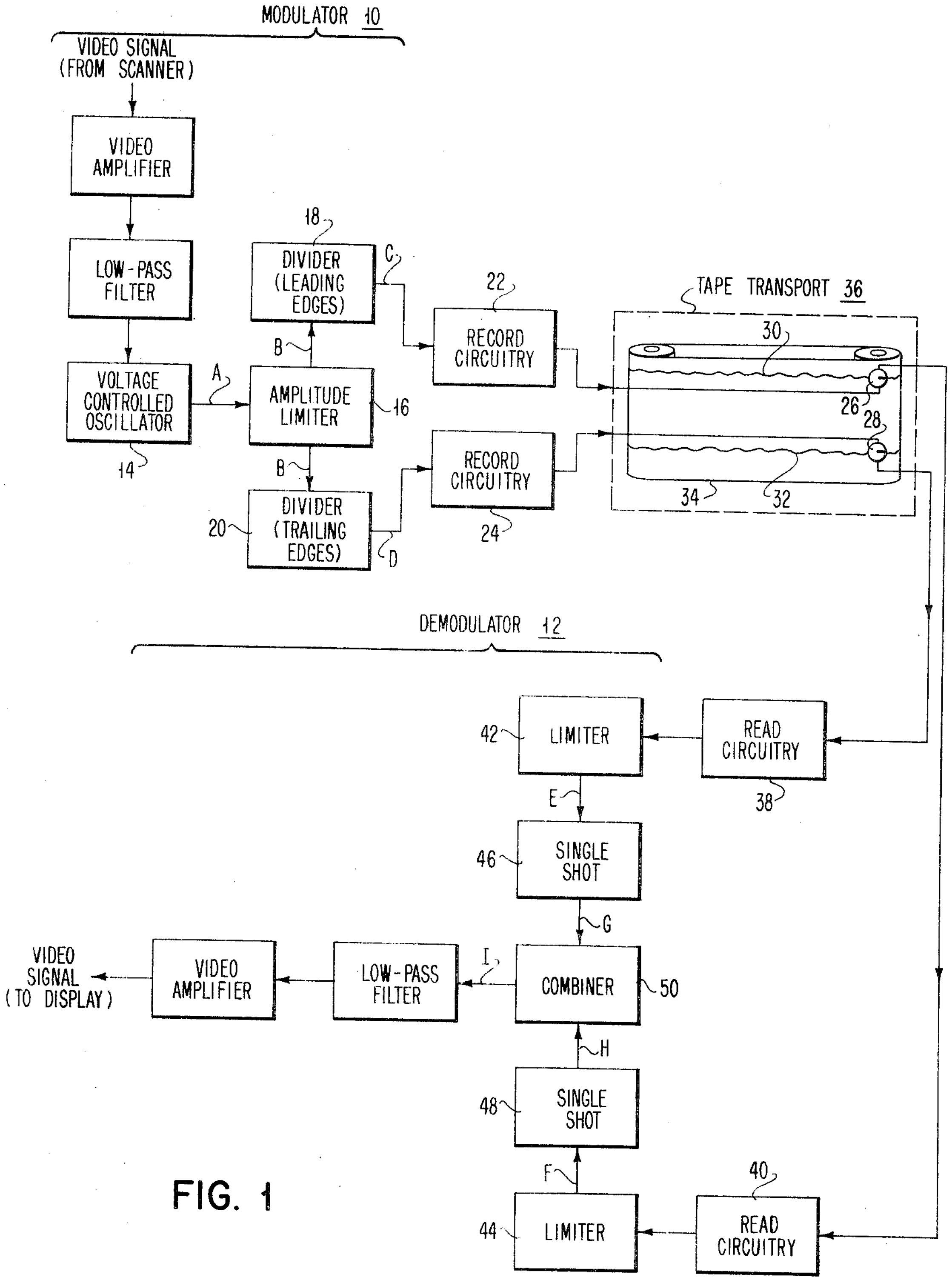

This invention relates to wideband recording or transmission systems in which it is necessary to employ a plurality of channels of limited bandwidth rather than a single wideband channel.

By way of abstract, the invention records a wideband FM signal in the form of the outputs of a pair of dividers, one responsive to the positive-going crossovers and the other responsive to the negative-going crossovers of the input FM signal, and, on reproduction, supplies a replica of the original modulation by combining the outputs of two single-shots each responsive to the edges of one of the recordings and filtering the resulting signal.

In the general effort toward improved image storage and retrieval, video recording is becoming practical for an increasing number of different kinds of information. Printed documents, binary-coded data, still photographs, motion pictures and other forms heretofore too diverse for handling, can now be converted and combined within a system for storage, display and output in other forms. These new possibilities introduce new bandwidth requirements as the level of image detail increases and as systems are designed with many output devices operating simultaneously from a shared pool of information.

In systems featuring television-like devices, for example, a stable and continuous display is essential. To make each display as satisfactory as if it were the only one in operation, a video buffer may be used. This might comprise a loop of magnetic tape with one closed recording track for each display station to be served. In such a case, the signals for each video frame might frequency modulate a carrier which is recorded on the tape loop; the track is read repetitively to supply a steady image at the display unit.

This method can handle limited bandwidths without difficulty, but refinements are needed to accommodate resolutions requiring bandwidths higher than about 6 mc. Thus, a bandwidth of about 10 mc. is needed if a system is to store or reproduce letter-size typewritten documents, and more detailed images may call for bandwidths of as much as 30 or 40 mc.

To provide for needs of this kind, improvement in the magnetic recording of video signals has utilized two general approaches. The first retains the single-channel recording configuration, but concentrates on improving magnetic head materials, recording media, modulation techniques and mechanical components. Such improvements are needed to assure reliable operation at the increased relative velocities between head and record which are involved.

Alternatively, frequency or time-division multiplexing can be employed to increase the video bandwidth capability, by utilizing a plurality of recording channels, and distributing the information contained in a wideband analog signal over the plurality of recording channels; the combined bandwidth capability approximates the single-channel capability multiplied by the number of channels employed. The present invention is such a system and thus has, for one of its objects, an increase in the bandwidth capability of a recording or data transmission system so that high resolution images may be handled.

It is another object of the invention to provide a buffer system for video signals, being particularly adaptable to the employment of magnetic recordings.

It is also an object of the invention to show how a wideband signal may be stored in narrow-band form, the latter retrieved from storage and synthesized to provide a replica of the former essentially free from distortion or other deleterious effects.

The foregoing and other objects, feaautres and advantages of the invention will be apparent from the following more particular description of a preferred embodiment of the invention, as illustrated in the accompanying drawings.

Figure 2:
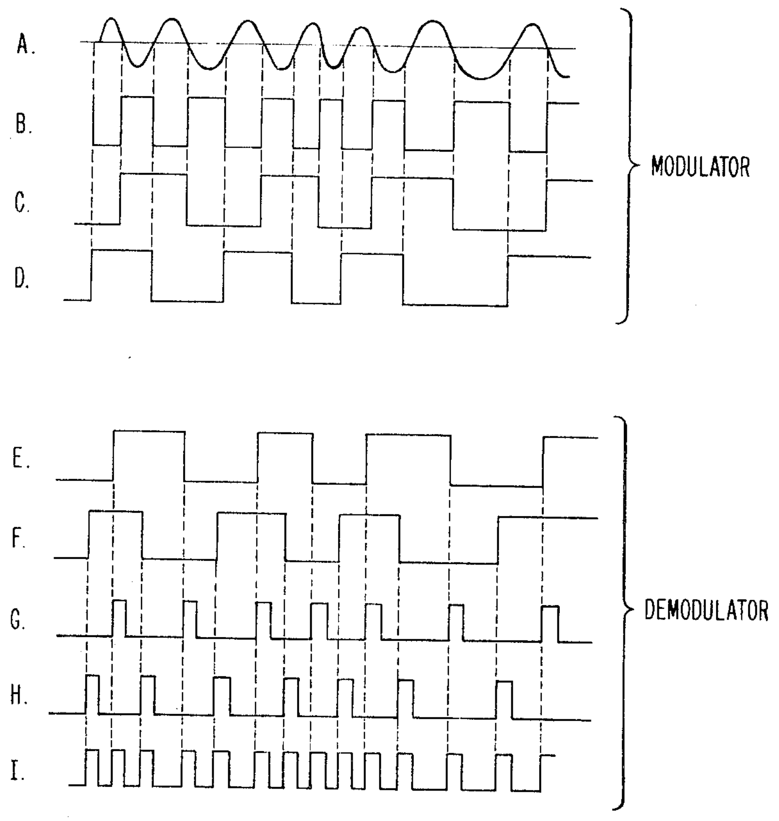

FIG. 1 is a block diagram of a magnetic tape video storage system which includes a modulator and demodulator according to the invention, and FIG. 2 is a set of waveshape diagrams depicting the signals at various components of FIG. 1.

The invention accepts as input a wideband signal in which analog video appears as frequency modulation of a carrier wave. This video signal is amplitude limited and the resulting square waveshape provides input to a pair of binary dividers. One of the dividers changes state at each leading edge of the input whereas the other changes state at each trailing edge thereof. The outputs of the dividers, which, it may be appreciated, are narrow in bandwidth when compared to the output of the limiter, are recorded in separate channels of limited bandwidth capability. For retrieval, each channel output waveform is shaped to provide a pulse corresponding to every transition thereof, the two pulse waveshapes are combined and the sum signal is low-pass filtered to formulate a reproduction of the original video signal.

In FIG. 1 is shown a block diagram of a wideband frequency modulation two-channel magnetic tape loop recording system incorporating the invention.

In modulator 10, video signals, such as provided by a cathode ray tube scanner exposed to pictorial information, are, as indicated, amplified, filtered and fed to voltage controlled oscillator 14, the output of which comprises a sinusoid frequency modulated in accordance with the video. Such a signal is shown in waveform A of FIG. 2. Amplitude limiter 16 develops square-wave signal B which is input to a pair of dividers 18 and 20. Each of these dividers may comprise a T flip-flop (trigger) responsive to signal B; the former changes state at each positive-going transition to emit signal C and the latter changes state at each negative-going transition to emit signal D. As is apparent from an examination of signals C and D (FIG. 2), each pulse repetition rate approximates half that of signal B, i.e., each bandwidth requirement is about half that of signal B. Thus, for an original video signal having a bandwidth of 10 mc. and a deviation of ±700 kc. from a carrier frequency (i.e., center frequency of oscillator 14) of 12 mc., signals C and D would each be characterized by a bandwidth of 5 mc. and a deviation of ±350 kc. from a carrier frequency of 6 mc. Signals C and D are then recorded during a write cycle of operation of the system by circuits 22 and 24 and heads 26 and 28 on tracks 30 and 32, respectively, of magnetic tape loop 34 in tape transport unit 36.

In summary, recorded on tape 34, corresponding to a wideband signal input to the modulator, are a pair of recordings (on tracks 30 and 32) of relatively narrow bandwidth, one (on track 30) having an edge (leading or trailing) identifying the time of each positive-going transition (zero-crossing) of the original signal and the other (on track 32) having an edge identifying the time of each negative-going transition of the original signal. It is the function of demodulator 12 to accept these signals, as sensed by heads 26 and 28 during a read cycle of operation and as amplified and shaped by circuits 38 and 40, and combine them into a reproduction of the original signal so that, for instance, a video display may be correspondingly excited.

In demodulator 12, limiters 42 and 44 are energized by the generally sinusoidal outputs of circuits 38 and 40, respectively, to provide signals E and F, which, it is seen from FIG. 2, are identical to signals C and D. Signals E and F are fed to single-shots 46 and 48, each of which responds to the edges of their respective input waveforms, to provide a narrow pulse shorter in duration than the period of the highest video signal to be handled by the system. In FIG. 2, signals G and H accordingly corresponding to signals E and F, are summed in combiner 50, which may comprise a simple resistor network. The output of combiner 50 is shown as signal I. Signal I is then filtered and amplified, as shown, to form a replica of the modulating signal which may excite a video display.

Detailed circuitry appropriate to the blocks in the system of FIG. 1 are not presented here; it is believed that such details are sufficiently known to those practicing in this or allied arts, especially those relating to electronic computers and data processors, so that such presentation is not required for a reduction to practice. As an example, circuits for oscillator 14, limiters 16, 42 and 44, single-shots 46 and 48, combiner 50, the amplifiers and the filters are found in many textbooks on electronics; tape transport unit 36 and the associated circuits 22, 24, 38 and 40 are divulged in J. L. Bernstein, "Video Tape Recording," Rider Publisher, Inc., New York, 1960, especially chapters 4, 5 and 6 and a 50-inch loop of 1-inch tape, moving at a velocity of 1500 inches per second in relation to the heads will be found quite satisfactory; and dividers 18 and 20 may comprise T (trigger) flip-flops as described in M. Phister, Jr., "Logical Design of Digital Computers," John Wiley & Sons, Inc., New York, 1958, chap. 5.

It should further be understood that the waveshape diagrams of FIG. 2 have been idealized since distortions produced by various system arrangements would likely be different and showings thereof serve no purpose in teaching the present invention.

The above recording technique increases bandwidth capabilities by means of zero-crossover multiplexing of frequency-modulated waveforms and, although herein described in connection with a magnetic recording system which buffers high-resolution images for display, can be extended to include long-term storage of video and other analog information contained in FM form, or be employed in other systems where information is contained in waveform zero crossovers. It may be pointed out that, when used with a magnetic tape system in which there is contact between head and tape (to afford the highest bandwidth capability), two channels could be expected to provide a video bandwidth exceeding 20 mc. and, with magnetic disks or drums, the inherently higher degree of time-base stability makes practical the multiplexing of more than two-channels to give a system with variable bandwidth capability.

While the invention has been particularly shown and described with reference to a preferred embodiment thereof, it will be understood by those skilled in the art that various changes in form and details may be made therein without departing from the spirit and scope of the invention.

For instance, it should be apparent from an examination of signals E and F of FIG. 2, that their summation in a circuit which accomplishes the "equals" logic $F_9$ on page 53 of the Phister book, will yield a replica of signal B; this replica may then be demodulated, filtered and amplified into the original video modulation. In the alternative, it should also be apparent that a replica of signal B may also be generated if signals G and H are fed separately to the inputs of an R–S flip-flop as described in chapter 5 of the aforementioned book.

What is claimed is:

1. In a recording system having a source of wide band frequency modulated information signal, the improvement comprising:

means to convert the signal from said source to a constant amplitude modulated square wave signal, wherein the information is contained in the waveform zero-crossover;

a first bistable-state circuit responsive only to the leading edges of the signal from said converting means to change state producing a second signal;

a second bistable-state circuit responsive only to the trailing edges of the signal from said converting means to change state producing a third signal;

recording means providing a separate record for said second and said third signals.

2. The system of claim 1 wherein said converting means comprises an amplitude limiter.

3. The system of claim 2 wherein said bistable-state circuits comprise trigger flip-flops.

4. The system of claim 3 wherein said recording means is of the electromagnetic type.

5. The system of claim 1 and sensing means to generate a signal corresponding to each signal on said recording means;

means to convert each output from said sensing means to a square wave signal;

means connected to each of said second converting means to generate signals each having a pulse corresponding to every prescribed portion of the signals from said second converting means; and means to combine the signals from said pulse signal generating means to form a signal corresponding to the modulation of the output from said source.

6. The system of claim 5 wherein said pulse signal generating means generates a pulse corresponding to each edge of the signals from said second converting means.

7. The system of claim 5 wherein said second converting means comprise amplitude limiters.

8. The system of claim 7 wherein said pulse signal generating means comprise single-shot multivibrators.

9. The system of claim 8 wherein said combining means comprises a summing circuit.

References Cited

UNITED STATES PATENTS

| | | | |
|---|---|---|---|
| 2,944,107 | 7/1960 | Johnson | 178—6 |
| 2,944,113 | 7/1960 | Wehde et al. | 179—15.55 |
| 3,262,104 | 7/1966 | Clynes | 179—100.2 |
| 2,623,952 | 12/1952 | Hare | 179—100.2 |
| 2,812,510 | 11/1957 | Schulz | 179—100.2 |
| 2,817,073 | 12/1957 | Sorrells | 179—100.2 |
| 2,905,756 | 9/1959 | Graham | 178—6 |
| 2,950,352 | 8/1960 | Belck | 179—100.2 |
| 2,975,234 | 3/1961 | Le Blan | 178—6 |
| 3,037,091 | 5/1962 | Rothe | 179—100.2 |
| 3,042,754 | 7/1962 | McManis | 179—100.2 |

(Other references on following page)

| | | | |
|---|---|---|---|
| 3,161,730 | 12/1964 | Collins | 179—100.2 |
| 3,211,841 | 10/1965 | Uemura et al. | 179—100.2 |
| 3,222,459 | 12/1965 | Drapkin | 179—100.2 |

FOREIGN PATENTS

| | | |
|---|---|---|
| 624,638 | 6/1949 | Great Britain. |

BERNARD KONICK, Primary Examiner

J. P. MULLINS, Assistant Examiner

U.S. Cl. X.R.

178—6.6; 179—15.55